No. 740,751. PATENTED OCT. 6, 1903.
G. FRIEDMAN.
CAKE BEATER.
APPLICATION FILED NOV. 19, 1902.
NO MODEL.
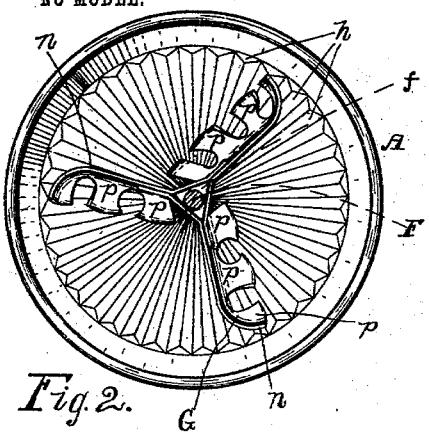
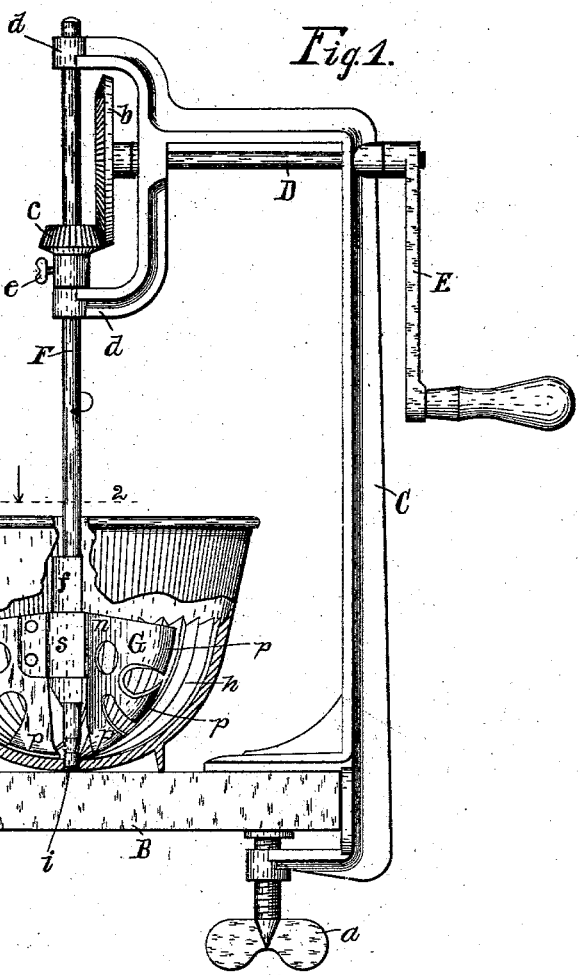
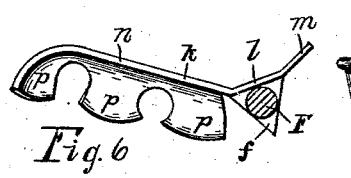
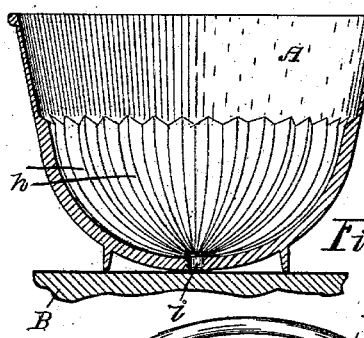
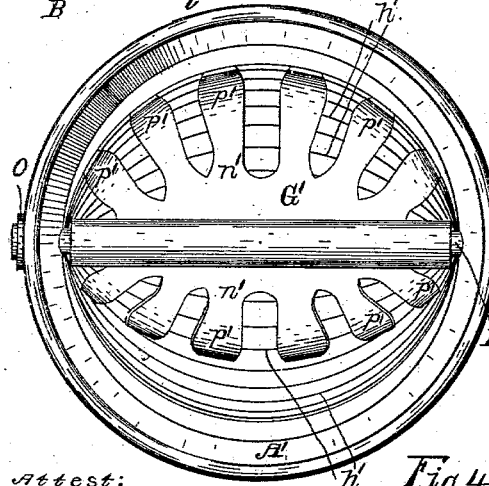
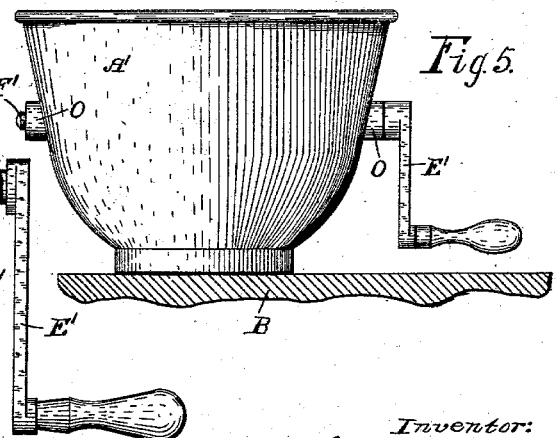
Attest:
M. B. Smith.
L. M. Williams
Inventor:
Goste Friedman
By E. B. Whitmore, Atty No. 740,751. Patented October 6, 1903.

UNITED STATES PATENT OFFICE.

GOSTE FRIEDMAN, OF JAMESTOWN, NEW YORK.

CAKE-BEATER.

SPECIFICATION forming part of Letters Patent No. 740,751, dated October 6, 1903.

Application filed November 19, 1902. Serial No. 132,003. (No model.)

*To all whom it may concern:*

Be it known that I, GOSTE FRIEDMAN, of Jamestown, in the county of Chautauqua and State of New York, have invented a new and useful Improvement in Cake-Beaters, which improvement is fully set forth in the following specification and shown in the accompanying drawings.

My invention is a device for use in the matter of cake-making, the invention being designed more particularly for the rapid creaming of compounds of butter and sugar or similar ingredients or for beating eggs and for thoroughly and quickly mixing the ingredients or parts going to make up the dough of the cake and for other similar uses, the invention being intended as an improvement on the device shown and set forth in Letters Patent No. 636,400, issued to me November 7, 1899.

My present invention consists, mainly, in the improved form of the bowl for holding the ingredients of the cake and of the form of the beater, the invention being hereinafter fully described, and more particularly pointed out in the claims, reference being had to the accompanying drawings, forming a part of the specification.

Figure 1 is a side elevation of the device as in use, a part of the bowl being broken away and axially sectioned. Fig. 2 is a plan of the bowl, the beater-shaft being transversely sectioned as on the dotted line 2 in Fig. 2. Fig. 3 is an axial section of the bowl. Fig. 4 is a plan of a modification of the device, Fig. 5 being a side elevation of the same. Fig. 6, drawn to a larger scale, shows one of the wings of the beater detached.

A in the drawings is a bowl or vessel of any suitable material, preferably aluminium, adapted to rest upon a table or shelf B.

C is a metal standard adapted to be attached to the table by simple means, as a clamp-screw $a$, said standard being conveniently detachable from the table to be laid away when not in use. The standard holds a horizontal shaft D, having a crank E at one end and a bevel-gear $b$ at the other. The standard is formed with branches $d\ d$, which hold in bearings a vertical shaft or stem F, provided with a bevel-pinion $c$, coacting with the gear $b$, so that by turning the crank the shaft F will be rapidly rotated.

G is a beater-head or beater held at the lower end of the shaft F, the latter and the bowl being coaxial with the beater centrally within the bowl, as shown. The shaft F is adapted to slide longitudinally through its bearings $d\ d$ in the standard C, being held in vertical adjustment by a thumb-screw $e$, threaded in the hub of the pinion $c$. A part $f$ at the lower end of the shaft F is made prismatic, preferably triangular, in form, this triangular head $f$ fitting a similarly-shaped eye or central opening in the beater G, as shown, to cause the beater to turn with the shaft. The extreme lower end of the shaft F is reduced in diameter to enter a central cylindrical cavity $i$, Figs. 1 and 2, at the inner bottom of the bowl for the double purpose of constituting a bearing for the shaft at that point and for keeping the beater always central within the bowl while acting upon the contents.

The bowl A is flaring and formed with internal ribs or corrugations $h$, Figs. 2 and 3, each being in a vertical plane, all of which intersect at the axis of the bowl. The corrugations converge toward the bottom of the bowl, and they act to prevent the cream or mixture within the bowl being too rapidly carried around by the revolving beater G. This beater is of peculiar construction, it being formed, preferably, with three equally-spaced perforated wings $n$ joined, the wings being irregularly indented at their edges and having curved projecting blades $p$, as shown, to act upon the material in the bowl. These wings are preferably made from sheet metal, all alike, and each being bent to produce three straight parts or sections $k\ l\ m$, Fig. 6, corresponding, respectively, with three vertical intersecting planes. The intermediate parts $l$ of the wings together constitute the triangular part $s$ of the beater-head surrounding the opening $g$ for receiving the prismatic part $f$ of the shaft F, each part $l$ of each wing constituting a side or wall of the opening. The extreme straight part or section $m$ of each wing overlaps the main straight part $k$ of the advance wing, as shown in Fig. 2, each overlapping part of either wing being secured rigidly to the adjacent part of the other wing by some simple mechanical means, as clamp-screws or rivets. When the beater-head is revolved within the bowl, the wings, with the blades *p*, move crosswise of the corrugations while acting upon the contained ingredients and rapidly reduce them to cream, as stated.

This device may, if found desirable in any case, act also upon soft dough. When the dough is first placed in the bowl, the beater-head is raised or slid upward along the shaft F and allowed to rest upon the mass of dough, the beater-head gradually working downward by the action of gravity as the dough becomes reduced in form and consistency.

In the modification shown in Figs. 4 and 5 the corrugations *h'* run from side to side of the bowl A' instead of vertically, each rib or corrugation being in a plane by itself, as in the form shown in Figs. 2 and 3, the beater G' revolving on a horizontal axis instead of turning around a vertical center, as in the form shown in Figs. 1 and 2. The horizontal beater-shaft F' rests in bearings *o o* at the sides of the bowl A', the beater being revolved by a crank E'. The wings *n'*, preferably three in number, of the beater G' are deeply indented at their edges, like the wings in the form shown in Figs. 2 and 6, and have peripheral blades *p'* for working the material as the beater is revolved, these blades striking across the corrugations *h'* of the bowl as the beater is turned by the crank, as in the form shown in Figs. 1 to 3. Both shafts F and F' are removable from the respective beaters G G' and from their holders or bearings, to the end that the beaters may be readily removed from the inclosing bowls.

What I claim as my invention, and desire to secure by Letters Patent, is—

1. A cake-beater consisting of a bowl formed with internal ribs or corrugations, and a beater-head carried by a shaft and having wings having their lower edges parallel with the curved wall of the bowl and constructed to coact with said corrugations, and means for revolving the beater-head, substantially as and for the purpose specified.

2. A cake-beater consisting of a flaring bowl formed with internal corrugations, each occupying a different plane and intersecting at the axis of the bowl, and a beater-head having indented wings having their lower edges parallel with the curved wall of the bowl and constructed to move crosswise of the corrugations, and means for turning the beater-head, substantially as shown and described.

3. A cake-beater comprising, in combination with a bowl, flared and formed with internal corrugations each in a vertical plane and all intersecting at the axis of the bowl, a beater-head and means for operating it, the beater-head consisting of a series of wings overlapping and joined to form a rigid body and having curved edges concentric with the curved wall of the bowl substantially as shown and described.

4. A cake-beater comprising, in combination with a bowl flared and formed with internal corrugations each in a vertical plane and all intersecting at the axis of the bowl, a beater-head and means for operating it, the beater-head consisting of a series of equal overlapping wings having straight parts forming angles one with another and having curved edges concentric with the curved wall of the bowl, the corresponding straight parts of the wings being associated to form an inclosure, substantially as and for the purpose set forth.

5. In a cake-beater, the combination of a bowl flared and provided with internal corrugations, of a beater-head, said head and bowl being coaxial, and the latter formed with perforated wings irregularly indented at their edges and having curved projecting blades disposed in a plane parallel with the curved wall of the bowl.

6. In a cake-beater, the combination of a bowl flared and provided with internal corrugations, of a beater-head, said head and bowl being coaxial, and the latter formed with perforated wings irregularly indented at their edges and having curved projecting blades disposed in a plane parallel with the curved wall of the bowl, the beater-shaft having a triangular portion fitting a similarly-shaped opening in the beater.

In witness whereof I have hereunto set my hand, this 3d day of November, 1902, in the presence of two subscribing witnesses.

GOSTE FRIEDMAN.

Witnesses:
A. FRIEDMAN,
W. E. ANDRUSS.